(12) United States Patent
Short

(10) Patent No.: US 7,215,776 B1
(45) Date of Patent: May 8, 2007

(54) METHOD AND APPARATUS FOR THE COMPRESSION AND DECOMPRESSION OF AUDIO FILES USING A CHAOTIC SYSTEM

(75) Inventor: Kevin M. Short, Durham, NH (US)

(73) Assignee: University of New Hampshire, Durham, NH (US)

( * ) Notice: Subject to any disclaimer, the term of this patent is extended or adjusted under 35 U.S.C. 154(b) by 613 days.

(21) Appl. No.: 09/597,101

(22) Filed: Jun. 20, 2000

Related U.S. Application Data

(63) Continuation-in-part of application No. 09/437,565, filed on Nov. 10, 1999, now Pat. No. 6,137,045, and a continuation-in-part of application No. 09/436,910, filed on Nov. 9, 1999, now Pat. No. 6,363,153.

(51) Int. Cl.
 *H04L 9/00* (2006.01)
(52) U.S. Cl. ......................................... 380/263; 380/46
(58) Field of Classification Search ................ 380/263; 369/100
 See application file for complete search history.

(56) References Cited

U.S. PATENT DOCUMENTS

| | | | |
|---|---|---|---|
| 4,941,193 A * | 7/1990 | Barnsley et al. ............ | 382/249 |
| 5,040,217 A | 8/1991 | Brandenburg et al. | |
| 5,048,086 A | 9/1991 | Bianco et al. | |
| 5,245,660 A | 9/1993 | Pecora et al. | |
| 5,291,555 A | 3/1994 | Cuomo et al. | |
| 5,347,600 A | 9/1994 | Barnsley | |
| 5,365,589 A | 11/1994 | Gutowitz | |
| 5,416,848 A | 5/1995 | Young | |
| 5,432,697 A | 7/1995 | Hayes | |
| 5,473,694 A | 12/1995 | Carroll et al. | |

(Continued)

FOREIGN PATENT DOCUMENTS

EP 1244274 A1 9/2002

(Continued)

OTHER PUBLICATIONS

David Boothroyd, Chaos Systems: Electronic Applications Reap the Benefits, New Eclectronic 27(10) Oct. 25, 1994 pp. 20-24.*

(Continued)

*Primary Examiner*—Nasser Moazzami
*Assistant Examiner*—Brandon Hoffman
(74) *Attorney, Agent, or Firm*—Fish & Neave IP Group, Ropes & Gray LLP; Jeffrey C. Aldridge

(57) ABSTRACT

A system for the compression and decompression of sections of audio files is provided. A library of basic waveforms is produced by applying selected digital initialization codes to a chaotic system. Each basic waveform is in one-to-one correspondence with an initialization code. A weighted sum of the selected basic waveforms is used to approximate a section of audio file. The basic waveforms are then discarded and only the weighting factors and the corresponding initialization codes are stored in a compressed audio file. When the compressed audio file is decompressed for playback, the stored initialization codes are stripped out and applied to a similar chaotic system to regenerate the basic waveforms, which are recombined according to the stored weighting factors to reproduce the original section of audio file.

21 Claims, 11 Drawing Sheets

U.S. PATENT DOCUMENTS

| | | | |
|---|---|---|---|
| 5,479,512 | A | 12/1995 | Weiss |
| 5,508,473 | A | 4/1996 | Chafe |
| 5,592,555 | A | 1/1997 | Stewart |
| 5,606,144 | A | 2/1997 | Dabby |
| 5,661,788 | A | 8/1997 | Chin |
| 5,680,462 | A | 10/1997 | Miller |
| 5,729,607 | A * | 3/1998 | DeFries et al. ............. 380/263 |
| 5,732,158 | A | 3/1998 | Jaenisch |
| 5,737,360 | A | 4/1998 | Grinstein et al. |
| 5,768,437 | A | 6/1998 | Monro et al. |
| 5,774,385 | A | 6/1998 | Bristol |
| 5,808,225 | A | 9/1998 | Corwin et al. |
| 5,818,712 | A | 10/1998 | Glenn |
| 5,838,832 | A | 11/1998 | Barnsley |
| 5,850,481 | A * | 12/1998 | Rhoads ...................... 382/232 |
| 5,857,025 | A | 1/1999 | Anderson |
| 5,857,165 | A | 1/1999 | Corron et al. |
| 5,923,760 | A | 7/1999 | Abarbanel et al. |
| 6,137,045 | A | 10/2000 | Short et al. |
| 6,178,217 | B1 | 1/2001 | Defries et al. |
| 6,208,951 | B1 | 3/2001 | Kumar et al. |
| 6,212,239 | B1 | 4/2001 | Hayes |
| 6,249,810 | B1 | 6/2001 | Kiraly |
| 6,275,615 | B1 | 8/2001 | Ida et al. |
| 6,363,153 | B1 | 3/2002 | Parker et al. |
| 6,374,177 | B1 | 4/2002 | Lee et al. |
| 6,389,463 | B2 | 5/2002 | Bolas et al. |
| 6,418,138 | B1 | 7/2002 | Cerf et al. |
| 6,546,427 | B1 | 4/2003 | Ehrlich et al. |
| 6,577,716 | B1 | 6/2003 | Minter et al. |
| 6,581,103 | B1 | 6/2003 | Dengler |
| 6,587,563 | B1 | 7/2003 | Crandall |
| 6,631,166 | B1 | 10/2003 | Carroll |
| 6,678,215 | B1 | 1/2004 | Treyz et al. |
| 6,725,022 | B1 | 4/2004 | Clayton et al. |
| 6,744,893 | B1 | 6/2004 | Fleming-Dahl |
| 6,799,201 | B1 | 9/2004 | Lee et al. |
| 6,829,475 | B1 | 12/2004 | Lee et al. |
| 6,980,656 | B1 | 12/2005 | Hinton, Sr. et al. |
| 2001/0012365 | A1 | 8/2001 | Gaedke et al. |
| 2001/0037240 | A1 | 11/2001 | Marks et al. |
| 2001/0042109 | A1 | 11/2001 | Bolas et al. |
| 2002/0001381 | A1 | 1/2002 | Ukyo |
| 2002/0046084 | A1 | 4/2002 | Steele et al. |
| 2002/0059592 | A1 | 5/2002 | Kiraly |
| 2002/0091790 | A1 | 7/2002 | Cubley |
| 2002/0154770 | A1 | 10/2002 | Short |
| 2002/0164032 | A1 | 11/2002 | Short |
| 2004/0039796 | A1 | 2/2004 | Watkins |
| 2004/0143349 | A1 | 7/2004 | Roberts et al. |

FOREIGN PATENT DOCUMENTS

| | | |
|---|---|---|
| EP | 1260949 A1 | 11/2002 |
| WO | WO99/42990 | 8/1999 |
| WO | WO-99/43136 A1 | 8/1999 |
| WO | WO-01/31839 | 5/2001 |
| WO | WO-02/065386 | 8/2002 |
| WO | WO-03/003235 A1 | 1/2003 |

OTHER PUBLICATIONS

Definition of manipulate, http://www.google.com/search?hl=en&q=define%3A+manipulate, retrieved on Sep. 28, 2005.*
Carroll et. al., "Synchronizing Chaotic Systems", SPIE Chaos in Communications 32-43, 1993.
Carroll, Thomas L., "Communicating with Use of Filtered, Synchronized Chaotic Signals", IEEE Transactions on Circuits and Systems I: Fundamental Theory and Applications, vol. 42, No. 3, pp. 105-110, Mar. 1995.
Cuomo et. al., "Synchronization of Lorenz-Based Chaotic Circuits with Applications to Communications", IEEE Transactions on Circuits and Systems, 626-633, 1993.
Dachselt, F., "Chaotic Coding and Cryptoanalysis", IEEE International Symposium on Circuits and Systems, Jun. 9-12, 1997, Hong Kong, pp. 1061-1064.
Ding, M. et al., "Enhancing Synchronism of Chaotic Systems," Physical Review E, vol. 49, No. 2, pp. R945-948, Feb. 1994.
Final office action issued by Examiner James Seal on Dec. 21, 2000, in the prosecution of U.S. Appl. No. 09/436,910, now issued as U.S. Patent No. 6,363,153 (Method and apparatus for secure digital chaotic communication).
Hayes, S., Grebogi, C., and Ott, E., "Communicating with Chaos", Phys. Rev. Lett., vol. 70, No. 20, pp. 3031-3034, May 17, 1993.
Hayes, S., Grebogi, C., and Ott, E., "Experimental Control of Chaos for Communication", Phys. Rev. Lett., vol. 73, No. 13, pp. 1781-1786, Sep. 26, 1994.
Hunt, E. R., "Stabilizing High-Period Orbits in a Chaotic System: The Diode Resonator", Physical Review Letters, vol. 67, No. 15, pp. 1953-1957, Oct. 7, 1991.
Kavitha, V. et al., "Use of Chaotic Modeling for Transmission of EEG Data", International Conference on Information, Communications, and Signal Processing, ICICS '97, Singapore, Sep. 9-12, 1997, pp. 1262-1265.
Kruger, P. "Barbarian at the Gates?", Communications international, pp. 46-48, Jan. 1996.
Lai, "Synchronization of a Chaotic Optical System Using Control", SPIE Chaos in Communication, pp. 91-102, 1993.
Martienssen, W., "Chaotic Cryptology", Annalen der Physik, vol. 4, Issue 1, 1995, pp. 35-42.
Non-final office action issued by Examiner James Seal on Apr. 2, 2000, in the prosecution of U.S. Appl. No. 09/436,910, now issued as Patent No. 6,363,153 (Method and apparatus for secure digital chaotic communication).
Non-final office action issued by Examiner Jeffrey W. Donels on Dec. 17, 1999, in the prosecution of U.S. Appl. No. 09/437,565, now issued as U.S. Patent No. 6,137,045 (Method and apparatus for chaotic musical synthesis).
Ott, E. et al., "Controlling Chaos", Physical Review Letters, vol. 64, No. 11, pp. 1196-1199, Mar. 12, 1990.
Pecora et al., "Synchronization in Chaotic Systems", Physical Review Letters, vol. 64, No. 8, pp. 821-824, Feb. 19, 1990.###(ISR incorrectly cites No. 10, pp. 2374-2383).
Rossler, O. E., "An Equation for Continuous Chaos", Physics Letters A, vol. 57, No. 5, pp. 397-398, Jul. 12, 1976.
Shilnikov, "Mathematical Problems of Nonlinear Dynamics: A Tutorial", International Journal of Bifurcation and Chaos, vol. 7, No. 9, pp. 1953-2001, 1997.
Short, Kevin, "Steps Towards Unmasking Secure Communications," International Journal of Bifurcation and Chaos, vol. 4, No. 4, 1994, pp. 959-977.
Yang et. al., "Secure Communication via Chaotic Parameter Modulation", IEEE Transactions on Circuits and System 817-819, 1996.
Yang, T. et al., "Cryptanalyzing Chaotic Secure Communications Using Return Map", Physics.
Yang, Tao, "A Survey of Chaotic Secure Communication Systems", International Journal of Computational Cognition, vol. 2, No. 2, pp. 81-130, Jun. 2004. (http://www.YangSky.com/yangijcc.htm).
Zhou, C., "Extracting Information Masked by Chaos and Contaminated with Noise: Some Considerations on Security of Communication Approaches Using Chaos", Physics Letters A, vol. 234, No. 6, pp. 429-435, Oct. 13, 1997.
Dedieu et al., "Signal coding and Compression Based on Chaos Control Techniques," IEEE, 1995, pp. 1191-1194, XP002325883.
Degazio, "Towards a Chaotic Musical Instrument," ICMC Proceedings, pp. 393-395, (1993).
"Cubic Oscillator Explorer v0.51," http://web.archive.org/web/20010211000709/www-ks.rus.uni-stuttgart.de/people/sch . . . , (Oct. 20, 2005).
Notification of Reason(s) For Rejection from JP Patent Office (3 pages).
Decision of Rejection from JP Patent Office (2 pages).

Alvarez et al., "Chaotic Cryptosystems," Institute of Electrical and Electronics Engineers, Proc. 33rd annual 1999 International Carnahan Conference on Security Technology (ICCST) Madrid, Spain, Oct. 5-7, 1999, IEEE, 33:332-338, (1999).

Newell, et. al., "Synchronization fo Chaos Using Proportional Feedback," SPIE Chaos in Communications, pp. 115-130 (1993).

* cited by examiner

Basic Waveforms After Phase and Frequency Adjustment

METHOD AND APPARATUS FOR THE COMPRESSION AND DECOMPRESSION OF AUDIO FILES USING A CHAOTIC SYSTEM

CROSS-REFERENCE TO RELATED APPLICATIONS

This application is a Continuation-In-Part of both (i) Short, et al.—Method and Apparatus for Secure Digital Chaotic Communication—application Ser. No. 09/436,910 filed Nov. 9, 1999 (now U.S. Pat. No. 6,363,153) and (ii) Short, et al.—Method and Apparatus for Compressed Chaotic Music Synthesis—application Ser. No. 09/437,565 filed Nov. 10, 1999 (now U.S. Pat. No. 6,137,045).

FIELD OF THE INVENTION

The present invention relates generally to a method and apparatus for the efficient compression and decompression of audio files using a chaotic system. More specifically, it relates to a system for approximating a section of audio file with basic waveforms produced by applying selected digital initialization codes to a chaotic system and further processing the initialization codes to produce compressed audio files.

BACKGROUND OF THE INVENTION

In general, a chaotic system is a dynamical system which has no periodicity and the final state of which depends so sensitively on the system's precise initial state that its time-dependent path is, in effect, long-term unpredictable even though it is deterministic.

One approach to chaotic communication, Short, et al., Method and Apparatus for Secure Digital Chaotic Communication, U.S. patent application Ser. No. 09/436,910 ("Short I"), describes a chaotic system controlled by a transmitter/encoder and an identical chaotic system controlled by a receiver/decoder. Communication is divided into two steps: initialization and transmission. The initialization step uses a series of controls to drive the identical chaotic systems in the transmitter/encoder and receiver/decoder into the same periodic state. This is achieved by repeatedly sending a digital initialization code to each chaotic system, driving each of them onto a known periodic orbit and stabilizing the otherwise unstable periodic orbit. The necessary initialization code contains less than 16 bits of information. The transmission step then uses a similar series of controls to steer the trajectories of the periodic orbits to regions of space that are labeled 0 and 1, corresponding to the plain text of a digital message.

Short, et al., Method and Apparatus for Compressed Chaotic Music Synthesis, U.S. patent application Ser. No. 09/437,565 ("Short II"), describes the use of such an initialization step to produce and stabilize known periodic orbits on chaotic systems, which orbits are then converted into sounds that approximate traditional music notes. By sending a digital initialization code to a chaotic system, a periodic waveform can be produced that has a rich harmonic structure and sounds musical. The one-dimensional, periodic waveform needed for music applications is achieved by taking the x-, y-, or z-component (or a combination of them) of the periodic orbit over time as the chaotic system evolves. The periodic waveform represents an analog version of a sound, and by sampling the amplitude of the waveform over time, e.g., using audio standard PCM 16, one can produce a digital version of the sound. The harmonic structures of the periodic waveforms are sufficiently varied that they sound like a variety of musical instruments.

The present invention is a system for the compression and decompression of audio files, including without limitation music and speech files. In summary, a library of basic waveforms associated with a chaotic system is produced, according to Short II and as described in detail hereafter, by applying selected digital initialization codes to the chaotic system. The basic waveforms that can be produced with 16-bit initialization codes range from simple cases that resemble the sum of a few sine waves with an associated frequency spectrum containing only two or three harmonics, to extremely complex waveforms in which the number of significant harmonics is greater than 64. Importantly, the initialization codes are 16 bits regardless of whether the basic waveforms are simple or complex. By contrast, in a linear approach, one would expect the number of bits necessary to produce a waveform to be proportional to the number of harmonics in the waveform. Equally importantly, each initialization code is in one-to-one correspondence with a specific basic waveform, allowing the use of the corresponding initialization code to represent the basic waveform. Then basic waveforms selected from the library are used to approximate a section of audio file.

The basic waveforms that are most closely related to the section of audio file are selected, and a weighted sum of the selected waveforms is used to approximate the section of audio file. Once such a weighted sum is produced that approximates the section of audio file to a specified degree of accuracy, the basic waveforms can be discarded and only the weighting factors; the corresponding initialization codes; and certain frequency information described below are stored in a compressed audio file. The compressed audio file may also contain other implementation-dependent information, e.g. header information defining sampling rates, format, etc. When the compressed audio file is decompressed for playback, the initialization codes are stripped out and used to regenerate the basic waveforms, which are recombined according to the weighting factors in the compressed audio file to reproduce the original section of audio file.

The compressed audio file can be transmitted, or stored for later transmission, to an identical chaotic system for decompression at a remote location. In practice, the remote location does not need the compression part of the system and would only use the decompression part of the system if playback of the section of audio file is all that is desired.

A further degree of compression is often possible and desirable. After finding a suitable weighted sum of basic waveforms, the weighted sum can be examined and any waveforms that contribute less to the overall approximation than a specified threshold can be eliminated. When such waveforms are identified, the corresponding initialization codes can be removed from the compressed audio file. Also, because the compression is done on sections of audio file, it is possible to look at the basic waveforms and the corresponding initialization codes to determine if there is a predictable pattern to the changes in the weighting factors from section to section. If such patterns are detected, further compression of the compressed audio file can be achieved by storing only the requisite initialization code and information about the pattern of changes for the weighting factors.

It is an object of the present invention to create compressed music files for distribution over the Internet. Compression ratios at better than 50-to-1 may be possible, which will allow for the transmission of music files over the Internet with greatly improved download speed. It is possible to estimate the compression ratio for music based on how rapidly the music changes. These estimates indicate that if the music changes on a scale of 0.02 sec, so the important changes in the music occur 50 times a second, then compression of 60-to-1 should be achievable. If the music changes on a scale of 0.04 sec, compression of 120-to-1 should be achievable. It is also an object of the present invention to replace the standard MIDI technology used in the music industry with a system that is simpler, requires less memory and offers more flexible sampling requirements.

It is also an object of the present invention to produce compressed music files that decompress rapidly. For example, in one embodiment an unoptimized C++ program on a 300 $MH_z$ processor decompressed at better than three times faster than real time. In a more optimized version, decompression is better than 5 times faster than real time, running on a computer that is roughly equivalent to a 100 MHz processor.

It is yet another object of the present invention to create compressed audio files that are encrypted. For example, music files compressed with the present invention are naturally encrypted in accordance with Short I. In order to be able to decompress properly a compressed music file, it is necessary to have the proper chaotic decompressor. These decompressors could be distributed freely or to a group of registered users, thus allowing for some control over the distribution and reproduction of the compressed music files. Even greater control of the uses of the compressed music files can be achieved by incorporating a secondary layer of a secure chaotic distribution channel, using the technology described in Short I, to encode the digital bits of the compressed music files before transmitting them to a user. Since registered users can be given unique chaotic decoders, it will be possible to place a "security wrapper" around the compressed music files, so that only a registered user will be able to access the music. It will also be possible to structure the security wrapper so that a song can be played only once without paying a fee.

SUMMARY OF THE INVENTION

A new system for the compression and decompression of audio files is provided. A library of basic waveforms is produced by applying selected digital initialization codes to a chaotic system. Each initialization code produces and stabilizes an otherwise unstable periodic orbit on the chaotic system. The basic waveforms needed are achieved by taking the x-, y-, or z-component (or a combination of them) of the periodic orbits over time. The basic waveforms that can be produced with 16-bit initialization codes range from simple to complex, and each basic waveform is in one-to-one correspondence with an initialization code.

The basic waveforms in the library that are most closely related to a section of audio file to be compressed are selected, and a weighted sum of the selected basic waveforms is used to approximate the section of audio file. Once such a weighted sum is produced to approximate the section of audio file to a specified degree of accuracy, the basic waveforms can be discarded and only the weighting factors and the corresponding initialization codes, as well as certain frequency information, are stored in a compressed audio file. When the compressed audio file is decompressed for playback, the stored initialization codes are stripped out and used to regenerate the basic waveforms, which are recombined according to the stored weighting factors to reproduce the original section of audio file.

A further degree of compression may be achieved if, after finding a suitable weighted sum of basic waveforms, any basic waveforms may be eliminated. Also, if there is a predictable pattern to changes in the weighting factors from section to section, further compression can be achieved by storing only the requisite initialization code and information about the pattern of changes for the weighting factors.

The foregoing and other objects, features and advantages of the present invention will be apparent from the following detailed description of preferred embodiments of the invention as illustrated in the accompanying drawings.

IN THE DRAWINGS

DETAILED DESCRIPTION OF THE INVENTION

Figure 1:
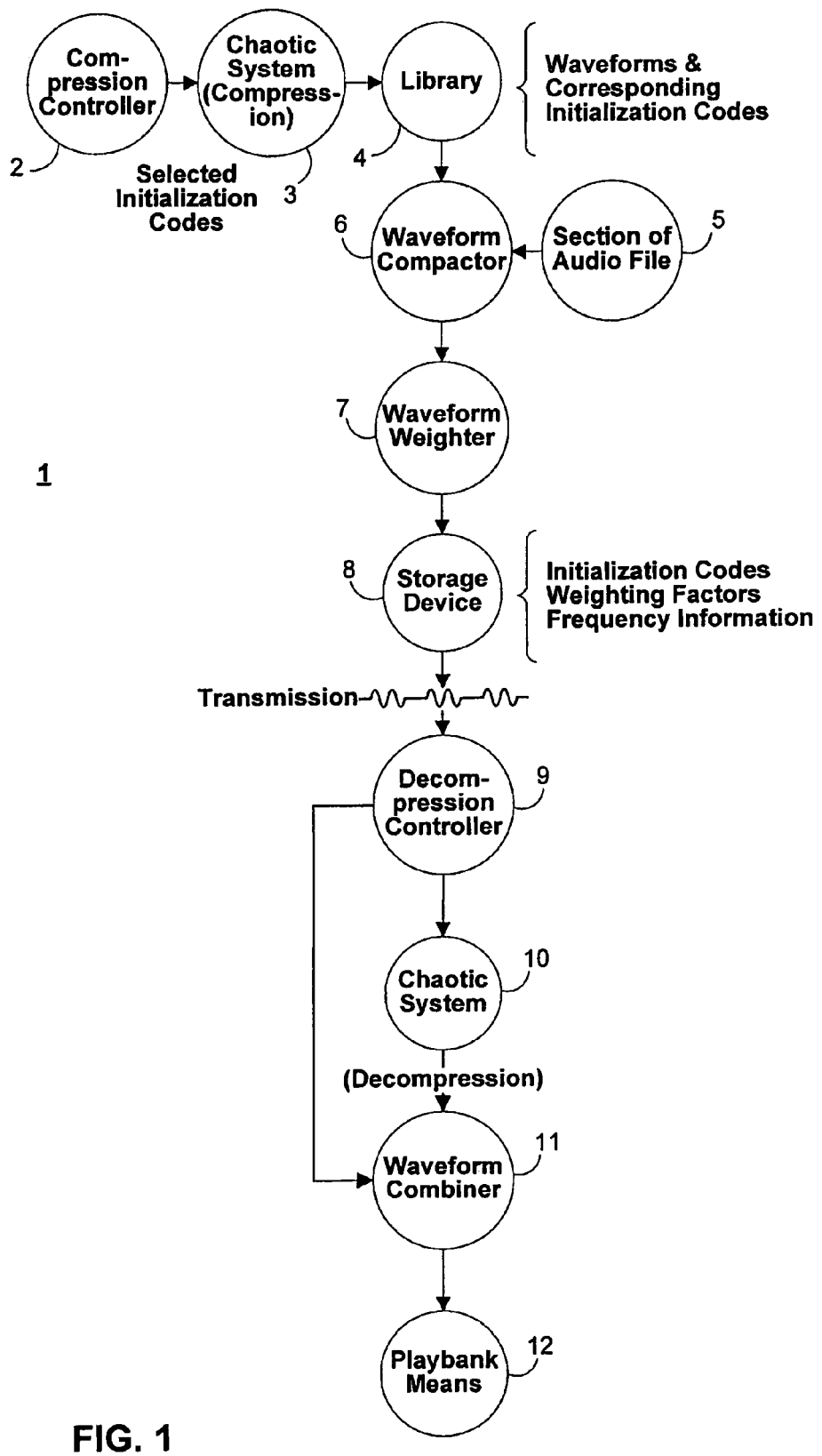
FIG. 1 is a block diagram of a compression and decompression system for audio files according to an embodiment of the present invention.

A block diagram of an embodiment of the present invention is contained in FIG. 1. The system 1 for compression and decompression of audio files comprises a compression controller 2 to apply selected digital initialization codes to a selected chaotic system 3. Each initialization code produces a basic waveform that is stored in a library 4 with its corresponding initialization code. A section of audio file to be compressed 5 is analyzed in a waveform comparator 6, which then selects the basic waveforms in the library 4 that are most closely related to the section of audio file to be compressed 5 and their corresponding initialization codes. A waveform weighter 7 then generates a weighted sum of the selected basic waveforms to approximate the section of audio file 5 and the weighting factors necessary to produce the weighted sum. The basic waveforms are then discarded and only the weighting factors and the corresponding initialization codes comprise a compressed audio file, which is stored in a storage device 8. For decompression and playback, the compressed audio file is transmitted to a remote decompression controller 9, which strips out the stored initialization codes and applies them to chaotic system 10 that is identical to the chaotic system 3 used in compression. Each initialization code produces a basic waveform that is sent to a waveform combiner 11. The decompression controller also sends the stored weighting factor to the waveform combiner 11. The basic waveforms are combined in the waveform combiner 11 according to the weighting factors to reproduce the original section of audio file for playback through the customary means 12 for playback of a section of digital audio file.

Figure 2:
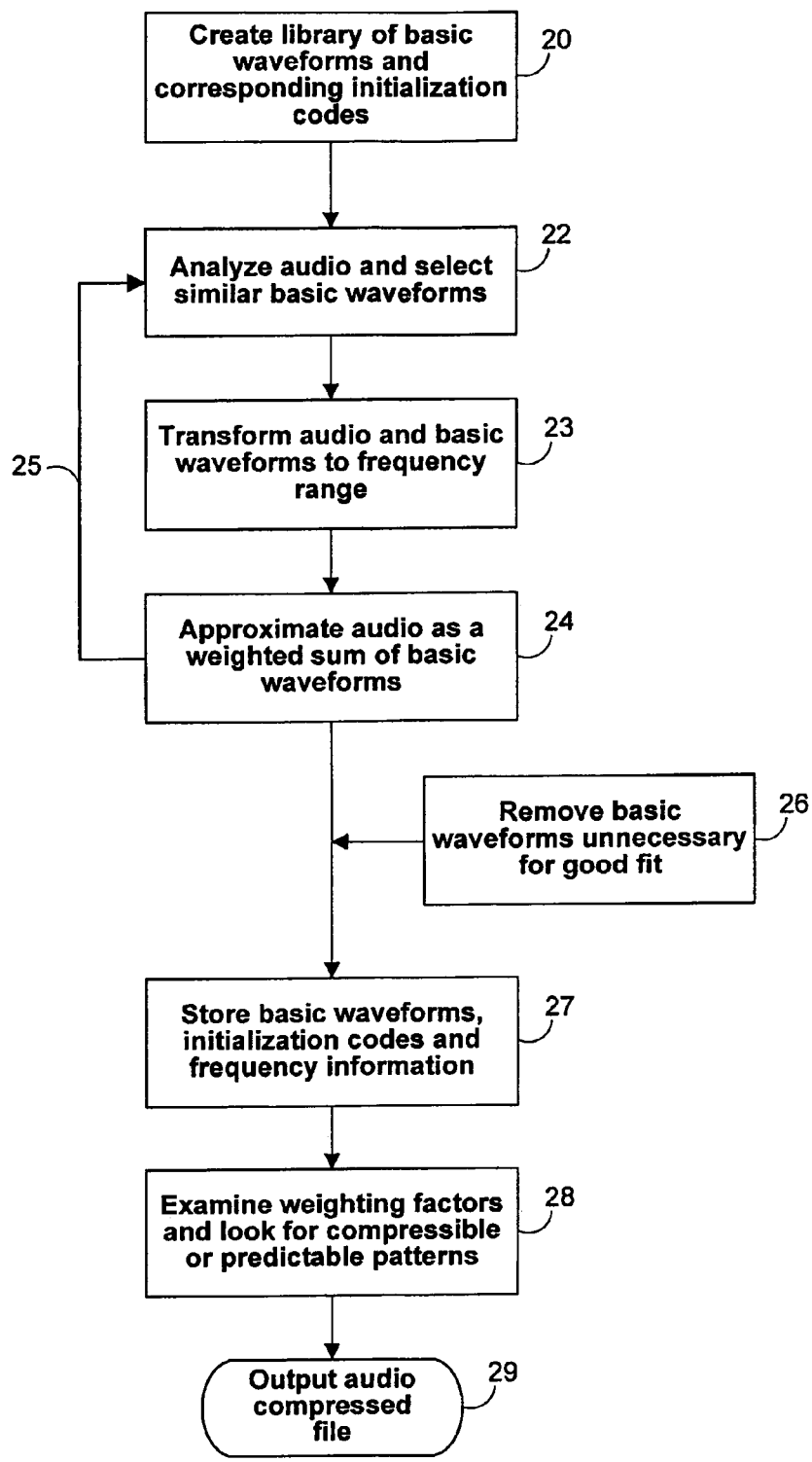
FIG. 2 is a flow chart showing the steps in general in a compression system for audio files according to an embodiment of the present invention.

A flowchart of a preferred embodiment of the present invention, in general, for compression of audio files is shown in FIG. 2. The process begins with step 20 in which a library of basic waveforms and corresponding initialization codes is compiled as described in detail below. The library contains all of the basic waveforms and corresponding initialization codes for a particular chaotic system. In addition, key reference information about the waveforms can be stored efficiently in a catalog file. The information in the library can be static for a given embodiment. In most applications, the catalog file contains all relevant information and can be retained while the waveforms can be discarded to save storage space.

The present invention uses digital initialization codes to drive a chaotic system onto periodic orbits and to stabilize the otherwise unstable orbit. Each periodic orbit then produces a basic waveform that has a traditional musical sound since it includes the harmonic overtones that give different instruments their distinctive qualities. Consequently, instead of producing a single a pitch (i.e., a sine wave) at the root frequency, as might be produced by a tone generator, the periodic orbit contains overtones at multiples of the root frequency. In a preferred embodiment of the present invention in which a double scroll oscillator is the chaotic system used, each periodic orbit corresponds to a basic waveform with a natural harmonic structure that is related to the number of loops that take place around one lobe before moving off to the next lobe. Consequently, the variety of different periodic orbits produces basic waveforms, which correspond to different musical instruments. Thus, a group of initializing codes may produce basic waveforms that have the tonal qualities of a harpsichord; another group may produce basic waveforms that sound more like an electric guitar; another group may produce basic waveforms that sound like an electric piano, and so on.

Figure 3:
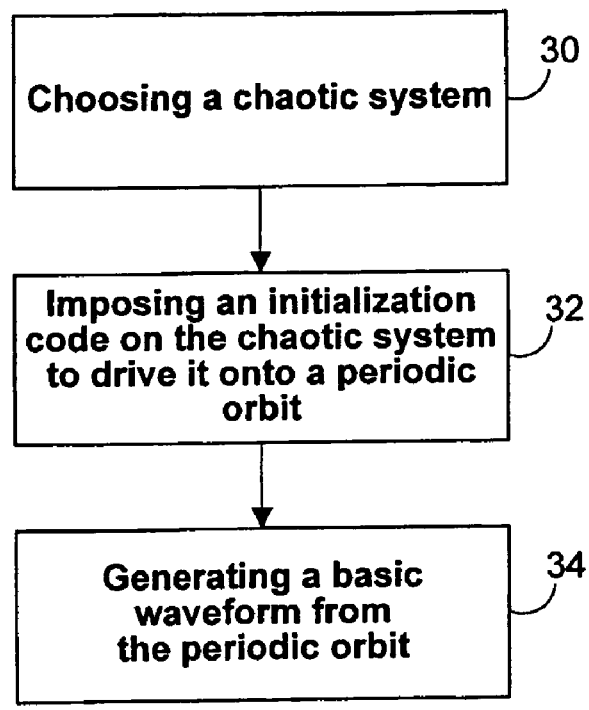
FIG. 3 is a flow chart showing in greater detail the creation of a library of basic waveforms according to an embodiment of the present invention.

FIG. 3 is a flow chart showing in greater detail the creation of the library of basic waveforms and corresponding initialization codes for a preferred embodiment. The first step 30 is choosing a chaotic system, to be driven onto periodic orbits to produce the basic waveforms. In a preferred embodiment, the chaotic system is a double-scroll oscillator [S. Hayes, C. Grebogi, and E. Ott, Communicating with Chaos, Phys, Rev. Lett. 70, 3031 (1993)], described by the differential equations $$g(v) = \begin{cases} m_1 v, & \text{if } -B_p \leq v \leq B_p; \\ m_0(v + B_p) - m_1 B_p, & \text{if } v \leq B_p; \\ m_0(v - B_p) + m_1 B_p, & \text{if } v \geq B_p. \end{cases}$$

where $$g(v) = \begin{cases} m_1 v, & \text{if } -B_p \leq v \leq B_p; \\ m_0(v + B_p) - m_1 B_p, & \text{if } v \leq -B_p; \\ m_0(v - B_p) + m_1 B_p, & \text{if } v \geq B_p. \end{cases}$$

Figure 4:
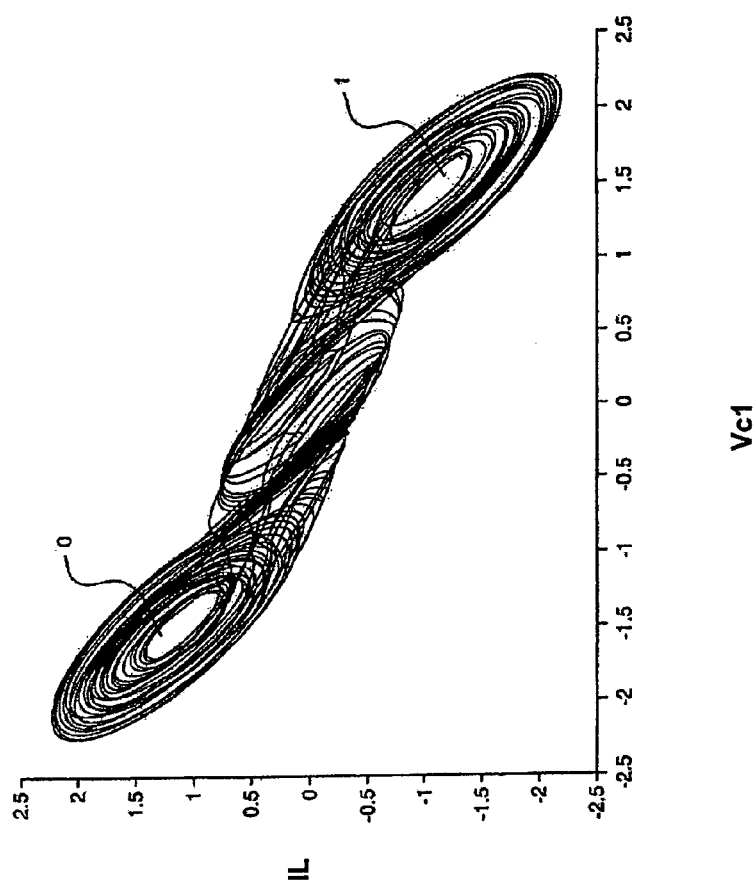
FIG. 4 is a plot of the double scroll oscillator resulting from the given differential equations and parameters.

The attractor that results from a numerical simulation using the parameters $C_1=1/9$, $C_2=1$, $L=1/7$, $G=0.7$, $m_0=-0.5$, $m_1=-0.8$, and $B_p=1$ has two lobes, each of which surrounds an unstable fixed point, as shown in FIG. 4.

Because of the chaotic nature of this oscillator's dynamics, it is possible to take advantage of sensitive dependence on initial conditions by carefully choosing small perturbations to direct trajectories around each of the loops of the oscillator. This ability makes it possible, through the use of an initialization code, to drive the chaotic system onto a periodic orbit that is used to produce a basic waveform.

Figure 5:
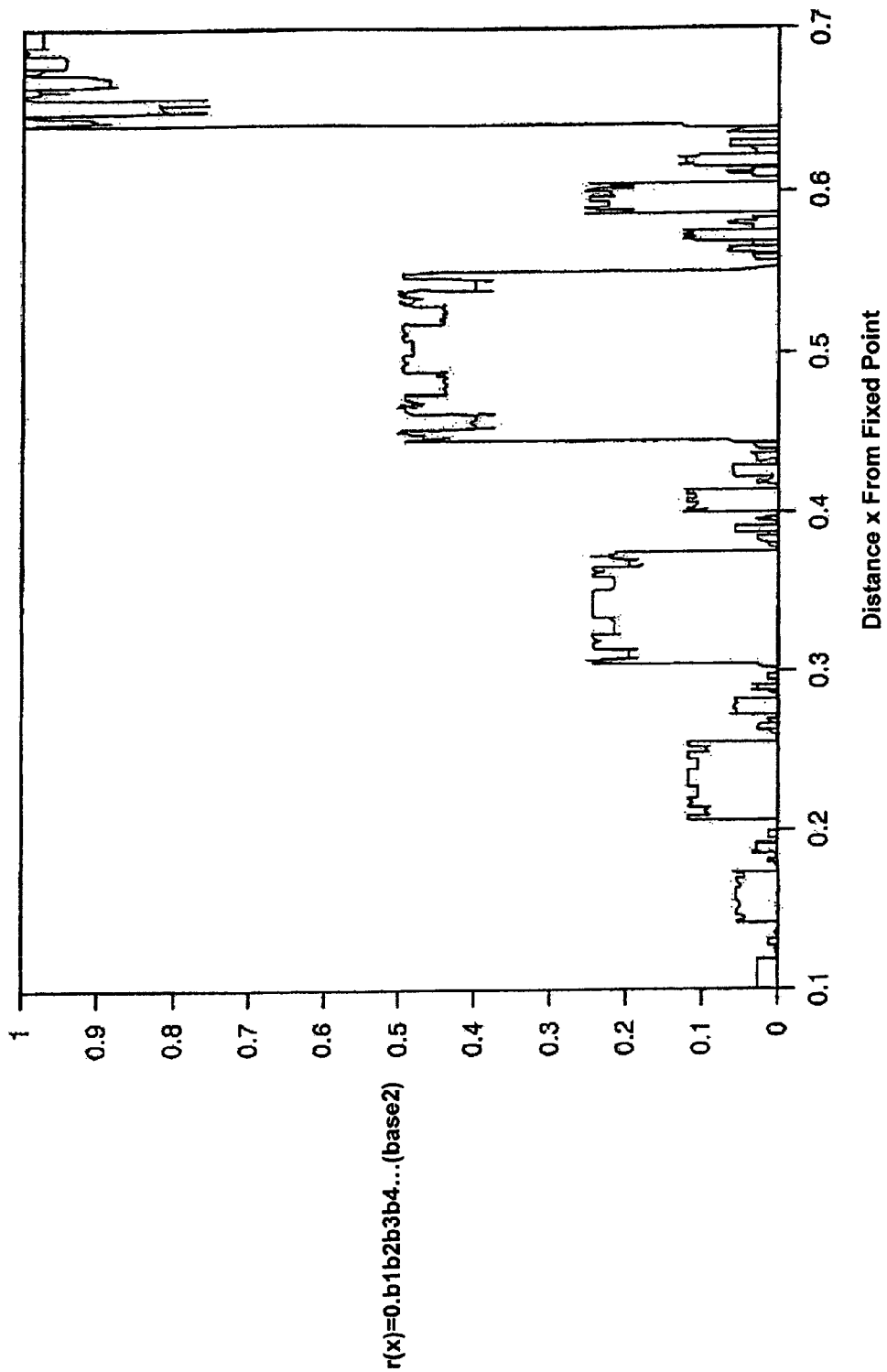
FIG. 5 is a plot of the function r(x) for twelve loops around the double scroll oscillator.

There are a number of means to control the chaotic oscillator. In a preferred embodiment, a Poincare surface of section is defined on each lobe by intersecting the attractor with the half planes $i_L=\pm GF$, $|v_{C1}| \leq F$, where $F=B_p(m_0-m_1)/(G+m_0)$. When a trajectory intersects one of these sections, the corresponding bit can be recorded. Then, a function r(x) is defined, which takes any point on either section and returns the future symbolic sequence for trajectories passing through that point. If $1_1, 1_2, 1_3, \ldots$ represent the lobes that are visited on the attractor (so $1_i$ is either a 0 or a 1), and the future evolution of a given point $x_0$ is such that $x_0 \rightarrow 1_1, 1_2, 1_3, \ldots, 1_N$ for some number N of loops around the attractor, then the function r(x) is chosen to map $x_0$ to an associated binary fraction, so $r(x_0)=0.1_1 1_2 1_3 \ldots 1_N$, where this represents a binary decimal (base 2). Then, when r(x) is calculated for every point on the cross-section, the future evolution of any point on the cross-section is known for N iterations. The resulting function is shown in FIG. 5, where r(x) has been calculated for 12 loops around the attractor.

Control of the trajectory can be used, as it is here, for initialization of the chaotic system and also for transmission of a message. Control of the trajectory begins when it passes through one of the sections, say at $x_0$. The value of $r(x_0)$ yields the future symbolic sequence followed by the current trajectory for N loops. For the transmission of a message, if a different symbol in the Nth position of the message sequence is desired, r(x) can be searched for the nearest point on the section that will produce the desired symbolic sequence. The trajectory can be perturbed to this new point, and it continues to its next encounter with a surface. This procedure can be repeated as many times as is desirable.

The calculation of r(x) in a preferred embodiment was done discretely by dividing up each of the cross-sections into 2001 partitions ("bins") and calculating the future evolution of the central point in the partition for up to 12 loops around the lobes. As an example, controls were applied so that effects of a perturbation to a trajectory would be evident after only 5 loops around the attractor. In addition to recording r(x), a matrix M was constructed that contains the coordinates for the central points in the bins, as well as instructions concerning the controls at these points. These instructions simply tell how far to perturb the system when it is necessary to apply a control. For example, at an intersection of the trajectory with a cross-section, if $r(x_0)$. indicates that the trajectory will trace out the sequence 10001, and sequence 10000 is desired, then a search is made for the nearest bin to $x_0$ that will give this sequence, and this information is placed in M. (If the nearest bin is not unique, then there must be an agreement about which bin to take, for example, the bin farthest from the center of the loop.) Because the new starting point after a perturbation has a future evolution sequence that differs from the sequence followed by $x_0$ by at most the last bit, only two options need be considered at each intersection, control or no control. In an analog hardware implementation of the preferred embodiment, the perturbations are applied using voltage changes or current surges. In a software implementation of the preferred embodiment, the control matrix M would be stored along with the software computing the chaotic dynamics so that when a control perturbation is required, the information would be read from M.

A further improvement involves the use of microcontrols. For a preferred embodiment in software, each time a trajectory of the chaotic system passes through a cross-section, the simulation is backed-up one time step, and the roles of time and space are reversed in the Runge-Kutta solver so that the trajectory can be integrated exactly onto the cross-section without any interpolation. Then, at each intersection where no control is applied, the trajectory is reset so that it starts at the central point of whatever bin it is in. This resetting process can be considered the imposition of microcontrols. It removes any accumulation of round-off error and minimizes the effects of sensitive dependence on initial conditions. It also has the effect of restricting the dynamics of the chaotic attractor to a finite subset of the full chaotic attractor although the dynamics still visit the full phase space. These restrictions can be relaxed by calculating r(x) and M to greater precision at the outset.

As also shown on FIG. 3, the next step 32 in creating the library of initialization codes and basic waveforms is the imposition of an initialization code on the chaotic system. The initialization code drives the chaotic system onto a periodic orbit and stabilizes the otherwise unstable periodic orbit. More specifically, the chaotic system is driven onto a periodic orbit by sending it a repeating code. Different repeating codes lead to different periodic orbits. For a large class of repeating codes, the periodic orbit reached is dependent only on the code segment that is repeated, and not on the initial state of the chaotic system (although the time to get on the periodic orbit can vary depending on the initial state). Consequently, it is possible to send an initialization code that drives the chaotic system onto a known periodic orbit.

These special repeating codes lead to unique periodic orbits for all initial states, so that there is a one-to-one association between a repeating code and a periodic orbit. However, for some repeating codes, the periodic orbits themselves change as the initial state of the chaotic system changes. Consequently, repeating codes can be divided into two classes, initializing codes and non-initializing codes. The length of each periodic orbit is an integer multiple of the length of the repeating code. This is natural, since periodicity is attained only when both the current position on the cross-section as well as the current position in the repeating code is the same as at some previous time. To guarantee that the chaotic system is on the desired periodic orbit, it is sufficient that the period of the orbit is exactly the length of the smallest repeated segment of the initializing code.

Figure 6:
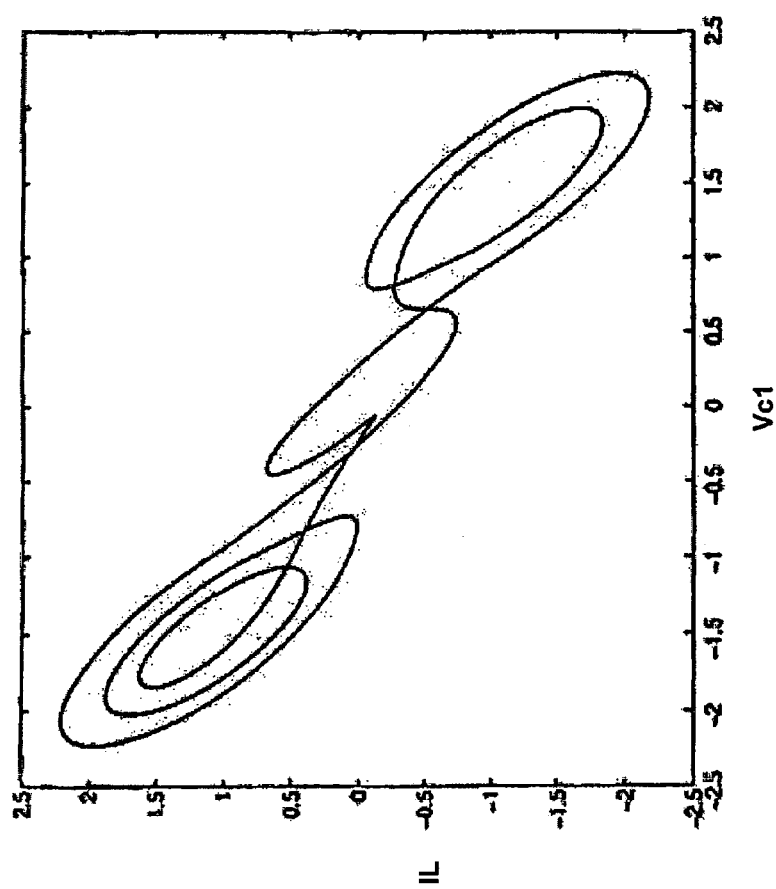
FIG. 6 is a plot of the periodic orbit of the double scroll oscillator resulting from a 5-bit initialization code (01011).

The number of initializing codes has been compared with the number of bits used in the initialization code, and it appears that the number of initializing codes grows exponentially. This is a promising result, since it means that there are many periodic orbits from which to choose. The compressed initializing code 01011 was repeated for the double-scroll oscillator of a preferred embodiment. The chaotic dynamics in FIG. 4 are driven onto the periodic orbit shown in FIG. 6, which periodic orbit is stabilized by the control code.

As is further shown on FIG. 3, the next step 34 in creating the library is generating a basic waveform, i.e. a one-dimensional, periodic waveform, for each periodic orbit by taking the x-, y-, or z-component (or a combination of them) of the periodic orbit over time. By sampling the amplitude of the waveform over time, e.g. using audio standard PCM 16, one can produce a digital version. These basic waveforms can be highly complex and have strong harmonic structure. The basic waveforms can have more than 50 strong harmonics for some initialization codes, and an important factor that contributes to the performance of the compression technology is the fact that complex basic waveforms with 50 strong harmonics can be produced with the same number of bits in the initialization code as simpler basic waveforms with only a few harmonics. This is indicative of the potential for compression inherent in this system since complex basic waveforms are produced as easily as simple basic waveforms. This is only possible because of the nonlinear chaotic nature of the dynamical system.

The chaotic system can be implemented entirely in software. The chaotic system in such an implementation is defined by a set of differential equations governing the chaotic dynamics, e.g, the double scroll equations described above. The software utilizes an algorithm to simulate the evolution of the differential equations, e.g., the fourth order Runge-Kutta algorithm.

The chaotic system can also be implemented in hardware. The chaotic system is still defined by a set of differential equations, but these equations are then used to develop an electrical circuit that will generate the same chaotic dynamics. The procedure for conversion of a differential equation into an equivalent circuit is well-known and can be accomplished with analog electronics, microcontrollers, embedded CPU's, digital signal processing (DSP) chips, or field programmable gate arrays (FPGA), as well as other devices known to one skilled in the art, configured with the proper feedbacks. The control information is stored in a memory device, and controls are applied by increasing voltage or inducing small current surges in the circuit.

Returning to the flow chart in FIG. 2, at step 22, a section of audio file to be compressed is chosen and analyzed and certain basic waveforms are selected from the library of waveforms. The section of audio file is analyzed and compared to the basic waveforms in the library. The comparison may be effected by extracting key reference information from the section of audio file and correlating it with the information in the catalog file. Those basic waveforms that are most similar, based on selected criteria, to the section of the audio file are then selected and used to build an approximation of the section of the audio file.

There are many approaches that can be employed to compare the basic waveforms and the section of audio file, including a comparison of numbers of zero crossings; number and relative power of harmonics in the frequency spectrum; a projection onto each basic waveform; and geometric comparisons in phase space. The technique chosen is dependent upon the specific application under consideration, but in a preferred embodiment, it has been effective to encapsulate the basic waveform information in a vector that describes the (normalized) magnitudes of the strongest harmonics.

A comparator matrix is created to contain the spectral peaks information for each basic waveform in the library.

Then, for a section of audio file, a comparison is made between the spectrum of the section of audio file, and the spectrum of the basic waveforms. In the encapsulated form, the basic waveform that is the closest match can be found merely by taking inner products between the section of audio file vector and the basic waveform vectors of spectral peaks. The best-match basic waveform is selected as the first basis function, along with other close matches and basic waveforms that closely matched the parts of the spectrum that were not fit by the first basis function. In different applications, there may be a variety of approaches to choosing the basic waveforms to keep as basis functions, but the general approach is to project the section of audio file onto the library basic waveforms. Finally, in some applications it is unnecessary or undesirable to keep a library of basic waveforms; in these cases the basic waveforms are recreated as needed by applying the corresponding initialization codes to the chaotic system.

After the appropriate basic waveforms have been selected, one can begin to approximate the section of audio file. In step 23, all of the selected basic waveforms and the section of audio file are transformed to a proper frequency range, either the audio file range or a fixed reference range, in which a comparison can be made. For example, they can be resampled so that they are in a fixed frequency range. This can be accomplished through standard resampling techniques. Typically, the resampling is done to obtain better resolution of the signals (i.e., upsampling), so no information is lost in the process.

Once the section of audio file and all the waveforms are in the proper frequency range, an approximation, in step 24, is possible. A necessary component is to align the basic waveforms properly with the waveforms of the section of audio file (i.e., adjust the phase), as well as to determine the proper amplification factor or weighting factor (i.e., adjust the amplitude). There are a number of ways this can be done, but the general approach involves a weighted sum of the chosen basic waveforms. The weighting factors are found by minimizing some error criterion or cost function, and will typically involve something equivalent to a least-squares fit to the section of the audio sample. A particularly efficient approach used in a preferred embodiment is to take all of the basic waveforms and split them into a complexified pair of complex conjugate waveforms. This can be accomplished by taking a basic waveform, $f_1$, calculating the fast Fourier transform of the basic waveform, call it $F_1$, then splitting the transform in the frequency domain into positive and negative frequency components $F_{1pos}$, $F_{1neg}$. The positive and negative frequency components are then transformed separately back to the time domain by using the inverse Fourier transform, resulting in a pair of complex conjugate waveforms that vary in the time domain, $f_{1pos}$ and $f_{1neg}$, where $f_{1pos}=(f_{1neg})^*$. The key benefit of the splitting and complexification of the waveforms is that when the complex conjugate waveforms are added together with any complex conjugate pair of weighting factors, the result is a real waveform in the time domain, so if $\alpha$ and $\alpha^*$ are the coefficients, then $\alpha f_{1pos}+\alpha^* f_{1neg}$ is a real function, and if the factors are identically 1 the original function $f_1$ is reproduced (adjusted to have zero mean). Further, by choosing $\alpha$ and $\alpha^*$ properly, the phase of the waveform can be automatically adjusted. In practice, all of the phase and amplitude adjustments can be achieved at once for all of the basic waveforms simply by doing a least squares fit to the section of music using the complexified pairs of complex conjugate waveforms derived from the basic waveforms. The weighting functions from the least squares fit are multiplied by the associated waveforms and summed to form the approximation to the music or speech. This approximation can then be tested to determine if the fit is sufficiently good in step 24, and if further improvement is necessary the process can be iterated 25.

The next stage of the compression, step 26, involves examining the approximation and determining if some of the basic waveforms used are unnecessary for achieving a good fit. Unnecessary basic waveforms can be eliminated to improve the compression.

After removing unnecessary basic waveforms, the initialization codes for the remaining basic waveforms, the weighting factors, and the frequency information can be stored in step 27, and then examined in step 28 to determine trends over sections of data. These trends can be predictable, and in test cases have been shown to be well-approximated by piecewise linear functions. When these trends are identified, the weighting factors for many consecutive sections of audio file can be represented by a simple function. This means that the weighting factors do not need to be stored for each section of audio file. This leads to improvements in the compression. Further improvement can be made by making geometric transformations on the space that contains the chaotic attractor, such as through conformal mappings, linear transformations, companding techniques or nonlinear transformations, so that the basic waveforms are altered slightly into a form more suitable for efficient compression. Finally at step 29, the compressed audio file is produced. The compressed audio file can be stored and transmitted using all storage and transmission means available for digital files.

Figure 7:
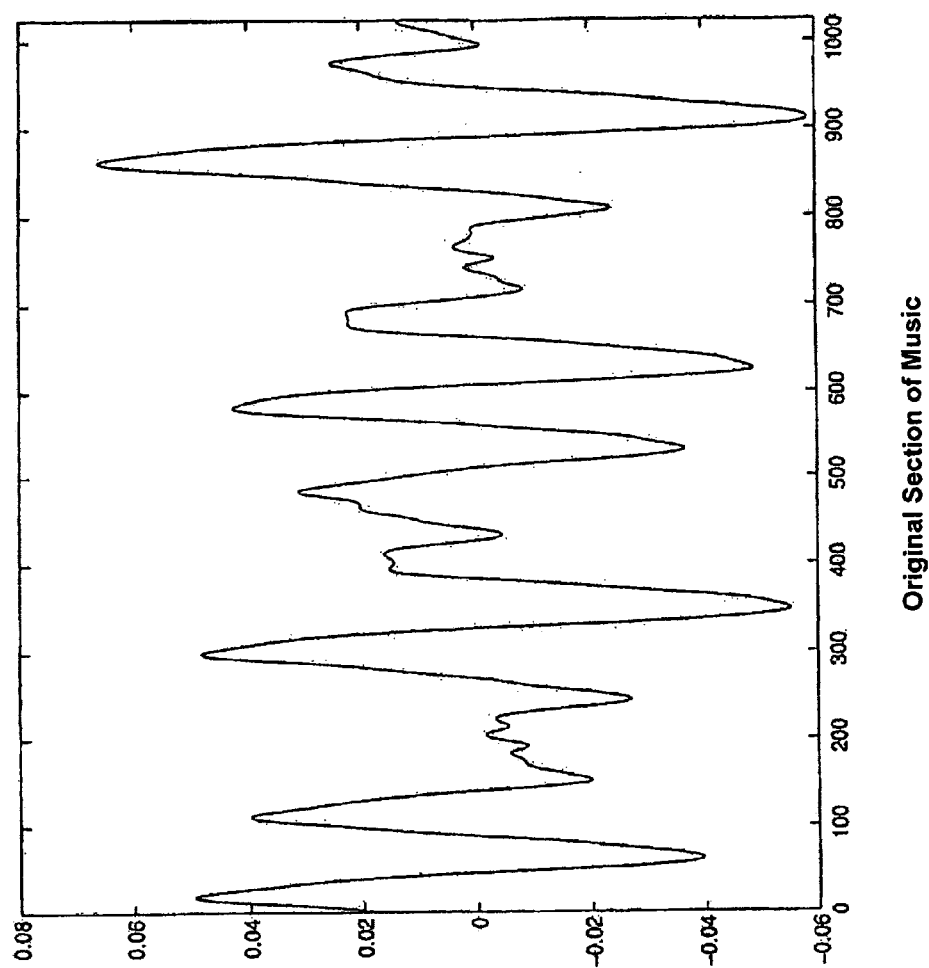
FIG. 7 is a plot of a section of music file.

Another preferred embodiment of the present invention is now described in more detail, but there are many variations that produce equivalent results. FIG. 7 shows a section of music, sampled at the standard CD rate of 44, 100 Hz with 16 bits of amplitude information stored for each sample. In this example, a section of music of length 1024 samples has been chosen, and the entire section is to be compressed. In general, the section length is an adjustable parameter, and in some implementations it would even vary during the compression of a single audio file.

Figure 8:
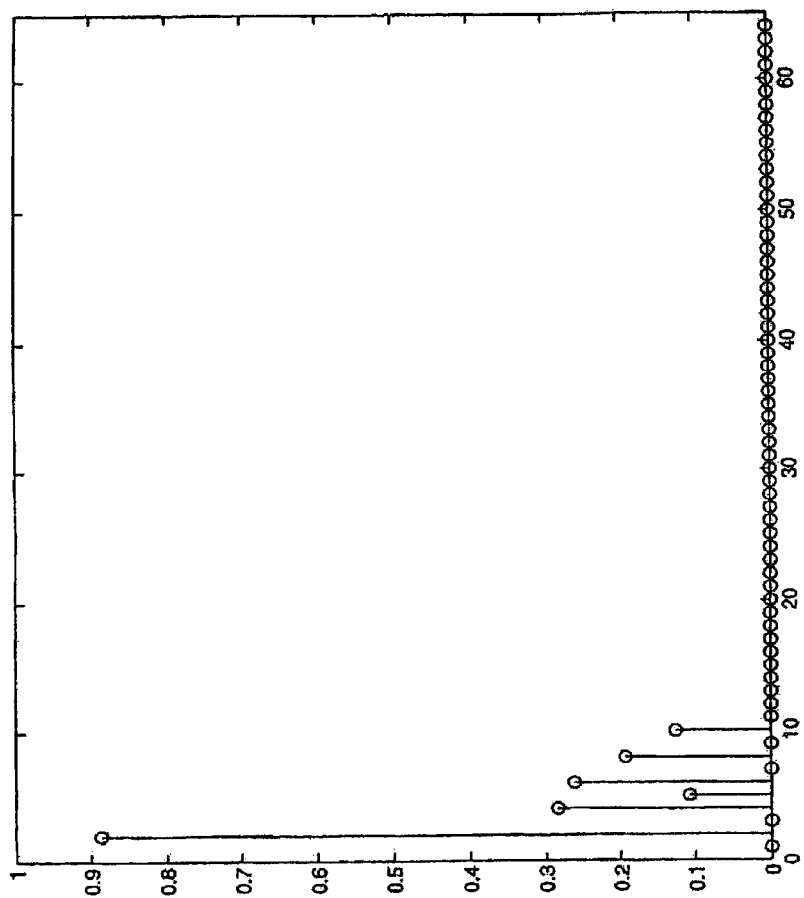
FIG. 8 is a plot of the value in $V_{peaks}$.

The first step in the process is to analyze the section of music to determine the harmonics present in the section of music. This is done by calculating the fast Fourier transform ("FFT") and then taking the magnitude of the complex Fourier coefficients. The spectrum of coefficients is then searched for peaks, and the peaks are further organized into harmonic groupings. At the first iteration, the harmonic group associated with the maximum signal power is extracted. This is done by determining the frequency of the maximum spectral peak, and then extracting any peaks that are integer multiples of the maximum spectral peak. These peaks are then stored in a vector, $v_{peaks}$, to give the first harmonic grouping. (In practice, further refinement of the harmonic grouping is necessary, since the fundamental or root frequency of a musical note is often not the maximum peak. Rather, the root frequency would be an integer subharmonic of the maximum frequency, so if $F_{max}$ is the frequency with the maximum power, harmonic groups of peaks based on a root frequency of $F_{max}/2$, then $F_{max}/3$, etc. would be extracted, and then the first harmonic group would be that one which captures the greatest power in the peaks. The vector containing the first harmonic grouping is taken to be of length 64 in this embodiment, and, although other implementations may set different lengths, it is necessary to allow for a large number of harmonics in order to capture the complexity of the basic waveforms. FIG. 8 gives a plot of the values in $v_{peaks}$. The goal at the next stage of the compression is to find basic waveforms that have similar harmonic structure to the section of music in question.

The second step in the process is to find basic waveforms in the library of basic waveforms that exhibit similar spectral characteristics. This process is rather simple because the library is established ahead of time and each basic waveform in the library has already been analyzed to determine its harmonic structure. Consequently, for each waveform in the library, a vector of harmonic peaks has been extracted, call these vectors $p_i$, where i varies over all waveforms and assume that 64 peaks have again been taken. These vectors are first normalized to have unit length and are then placed in a matrix, M, that has 64 columns and as many rows as there are waveforms (up to around 27000 in the current embodiment). In order to keep track of which waveform is associated with which row in M, an index table is set up that contains the control code associated with each row in M. Then, to find the closest match to the music vector, $v_{peaks}$, we can calculate the matrix product $x_{projection} = M v_{peaks}$ and find the maximum value in $x_{projection}$. The row that gives the maximum value corresponds to the basic waveform that matches the section of music most closely. We can then extract the corresponding initialization code from the index table, and we can generate the desired basic waveform or, if the basic waveforms have been stored digitally, we can just load it from the library of basic waveforms. In many instances, it is worthwhile to choose more than one close match to the section of music, since a weighted sum of several basic waveforms is necessary to produce a suitable match; these can be taken by selecting the largest values in $x_{projection}$, and taking the associated basic waveforms indicated in the index table.

Figure 9:
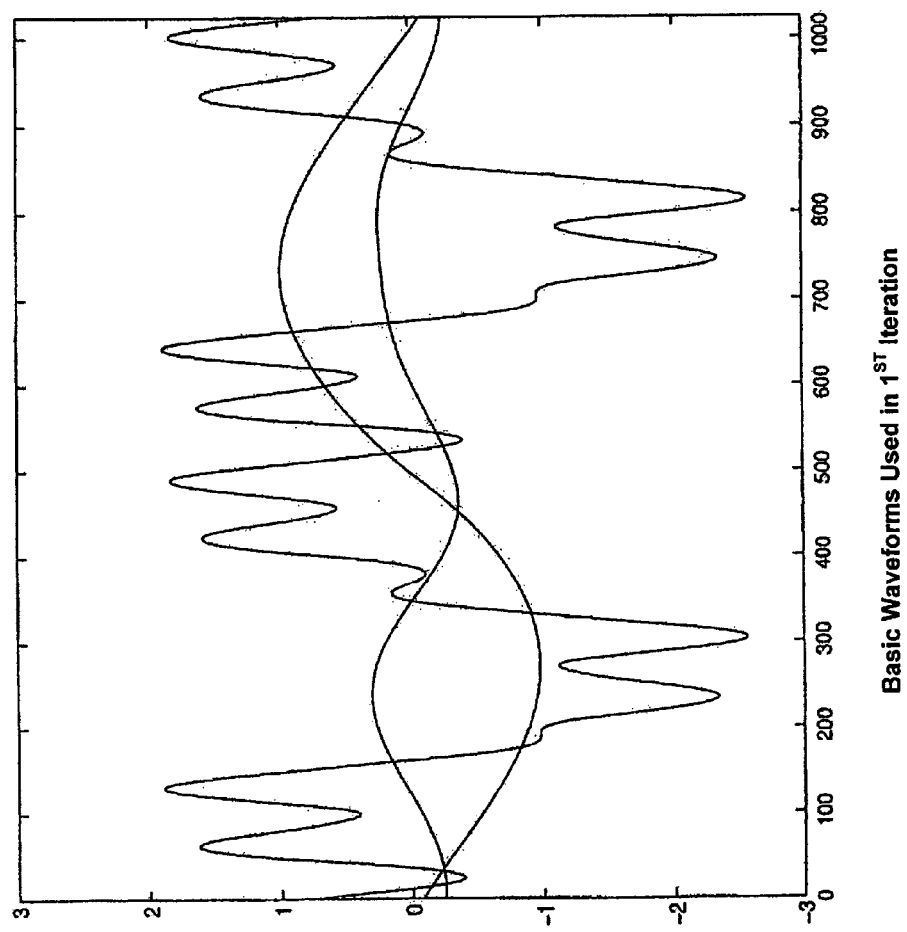
FIG. 9 is a plot of the full periods of three basic waveforms.

When this approach is applied to the section of music in FIG. 7, the best matches to the section of music are found to be given by control codes $XXXXXXXXX_a$, $YYYYYYYYY_b$, and $ZZZZZZZZZ_c$ where the subscript indicates which of the three dimensions in the basic waveform is to be used. One full period of these basic waveforms appears in FIG. 9. The waveforms must next be adjusted so that their periods and phases match that of the music file.

The third step in the process requires adjustment of the period and phase of the basic waveforms. Since the basic waveforms are periodic, the adjustment process can be completed without introducing any errors into the basic waveforms. This can be done entirely in the frequency domain, so the transformations are made to the FFT of the basic waveforms, using standard techniques known in signal processing. The basic waveforms will be adjusted so that the root frequencies of the basic waveforms match the root frequencies of the section of music. To do this, the FFT of the basic waveform is padded with zeros to a length that corresponds to the length of the FFT of the section of music. The complex amplitude of the root frequency of the basic waveform is then shifted up to the root frequency of the section of music, and the remaining harmonics of the root frequency of the basic waveform are shifted up to corresponding multiples of the root frequency of the section of music (the vacated positions are filled with zeros). After the shifting, if the inverse FFT is calculated, the basic waveforms will all have the same root frequency as the section of music; however, the phase of the basic waveforms may not match the phase of the section of music. So, before calculating the inverse FFT, the phase of the chaotic waveforms is adjusted so that the phase of the basic waveform matches the phase of the maximum peak in the section of music.

Figure 10:
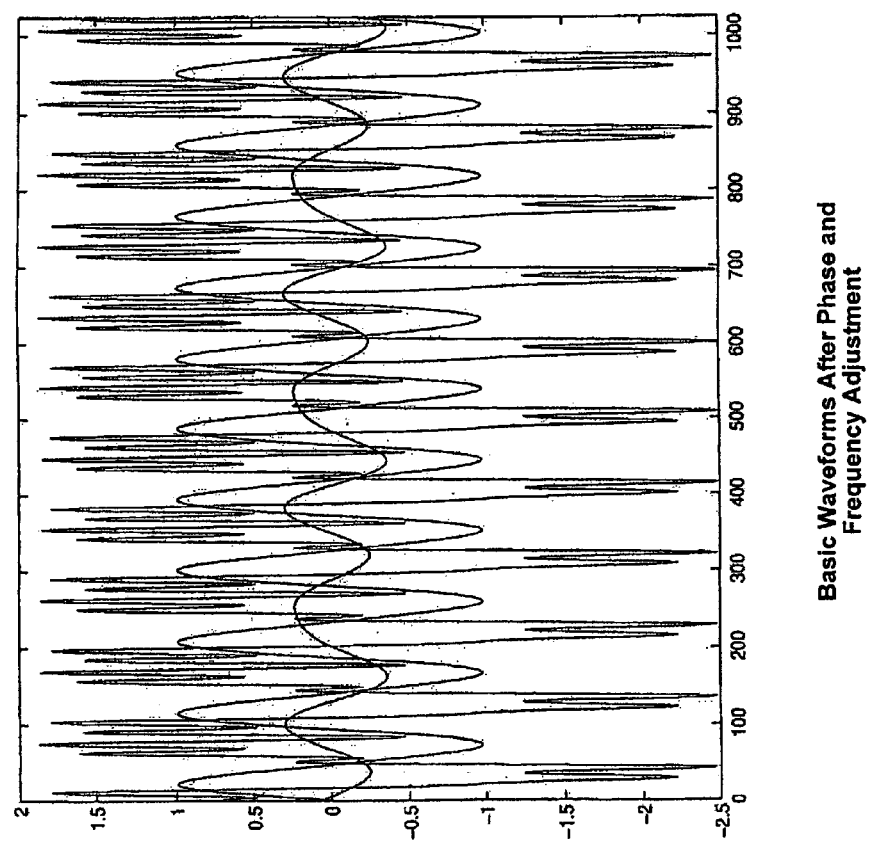
FIG. 10 is a plot of the full periods of three basic waveforms after phase and frequency adjustment.

The phase adjustment is achieved by multiplying the complex Fourier amplitudes in the FFT by an appropriate phase factor of the form $e^{i\theta}$ where $\theta$ is chosen to produce the correct phase for the peak corresponding to the maximum peak in the section of music, and the phases of the other spectral peaks are adjusted to produce an overall phase shift of the basic waveform. Note that by multiplying by a phase factor, the overall spectrum of the signal is unchanged. (Different embodiments of the technology use slightly different approaches to the phase adjustment, e.g., one can adjust the phase through filtering, or the phase adjustment can be calculated by a minimization principle designed to minimize the difference between the music and the basic waveform, or by calculating the cross-correlation between the basic waveforms and the section of music. All approaches give roughly equivalent results.) When the phase and frequency adjustments are made to the basic waveforms, the resulting waveforms are depicted in FIG. 10.

Figure 11A:
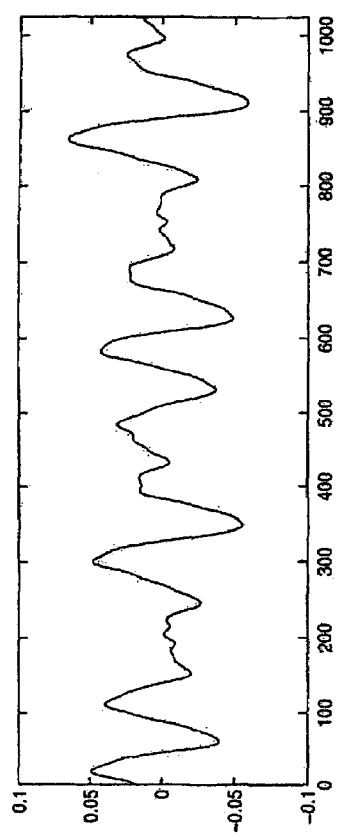
FIG. 11A is a plot of a section of a music file.
Figure 11B:
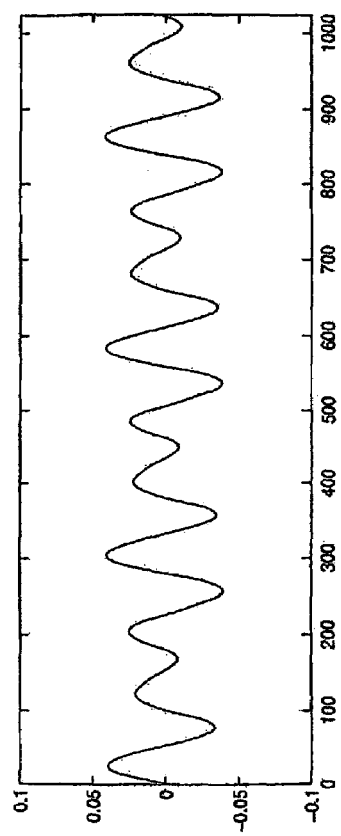
FIG. 11B is a plot of a first approximation of a section of music file using basic waveforms.

The fourth step in the process is to compute the weighting factors for the sum of basic waveforms that produces the closest match to the section of music. This calculation is done using a least-squares criterion to minimize the residual error between the section of music and the fitted (sum of) basic waveforms. The original section of music appears in FIG. 11A and a first approximation according to the present invention appears in FIG. 11B. The differences are extremely small and so the compressed chaotic version of the music sounds like is the original. In the event that the first group of basic waveforms does not produce a close enough match to the section of music, the process is iterated until the desired representation is reached. The compression results from the fact that the compressed chaotic version requires only information about the initialization codes, weighting factors and frequency for a few basic waveforms, rather than 16 bit amplitude information for each of the data points in the section of music.

Another embodiment of the present invention can be used to create compressed speech files. In one embodiment, speech samples from a standard database (the TIMIT database) are projected onto a family of waveforms built up from just 5 fiducial basic waveforms. The comparison of the speech and the waveforms s done at a fixed reference frequency, W, and the processing is done in a comparison block corresponding to N periods at the frequency W. The 5 waveforms are expanded or compressed so that in the comparison block, each fiducial waveform is resampled to produce a family of waveforms containing waveforms with a single period, two periods, three periods, four periods, five periods and six periods, respectively, in the comparison block. A section of the speech file is selected and its power spectrum is computed to find the dominant frequency with the maximum power. The section of speech is then resampled to shift the dominant frequency to the reference frequency W and a number of points corresponding to the length of the comparison block is taken. Note that the resampling is done so that the data is smoothly interpolated, so no information is lost. The section of speech is then approximated using a weighted sum of the waveforms. Each basic waveform is mapped to the corresponding initialization code and stored along with the weighting factors and frequency information in the compressed file. Processing on subsequent sections of the speech follows in a similar fashion. The compressed file can be decompressed to regenerate the (approximation to the) original section of speech, producing intelligible speech.

In a second embodiment, the basic waveforms are fixed, and no adjustments are made to match the frequencies present in the speech. To process a section of a speech file of block length L, a family of basic waveforms is selected and each basic waveform is recomputed to produce over the block length L, a single period, two full periods, three full periods, . . . , up to 6 full periods. Each basic waveform is then "twinned" to form an analog of a sine-cosine pair. This is achieved by taking each basic waveform and calculating the autocorrelation function. The first zero of the autocorrelation function defines a time lag such that if we take the basic waveform and a copy of itself that is shifted by the time lag, then the basic waveform and its shifted version are independent in an information theoretic sense. This family of basic waveforms can then be used to represent the section of speech, so that a compressed speech file is produced. The decompressed version of the compressed file produces intelligible speech. The high compression ratios may make practical Internet telephony that maintains fidelity possible.

What is claimed is:

1. A method of compressing an audio file comprising:
   choosing a chaotic system;
   applying selected digital initialization codes to the chaotic system such that each initialization code produces a periodic orbit and stabilizes the otherwise unstable orbit;
   generating a basic waveform for each periodic orbit such that the basic waveform is in a one-to-one correspondence to the initialization code for the periodic orbit;
   selecting and analyzing a section of audio file to be compressed;
   selecting the basic waveforms to be used and storing their corresponding initialization codes;
   transforming the section of audio file and the selected basic waveforms to a proper frequency range and storing frequency information describing the transformation;
   calculating weighting factors to create a weighted sum of the selected basic waveforms to approximate the section of audio file and storing the weighting factors; and
   combining the stored initialization codes, the stored frequency information and the stored weighting factors to comprise a compressed audio file.

2. The method of compressing an audio file of claim 1 further comprising the steps of:
   removing from the weighted sum of the selected basic waveforms any selected basic waveforms not deemed necessary to approximate the section of audio file; and
   removing the corresponding stored initialized codes.

3. The method of compressing an audio file of claim 1 further comprising the step of identifying trends over sections of compressed audio file and replacing the stored weighting factors for the sections of compressed audio file by a suitable function.

4. A system for compressing an audio file comprising:
   means for choosing a chaotic system;
   means for applying selected digital initialization codes to the chaotic system such that each initialization code produces a periodic orbit and stabilizes the otherwise unstable orbit;
   means for generating a basic waveform for each periodic orbit such that the basic waveform is in a one-to-one correspondence to the initialization code for the periodic orbit;
   means for selecting and analyzing a section of audio file to be compressed;
   means for selecting the basic waveforms to be used and means for storing their corresponding initialization codes;
   means for transforming the section of audio file and the selected basic waveforms to a proper frequency range and means for storing frequency information describing the transformation;
   means for calculating weighting factors to create a weighted sum of the selected basic waveforms to approximate the section of audio file and means for storing the weighting factors; and
   means for combining the stored initialization codes, the stored frequency information and the stored weighting factors to comprise a compressed audio file.

5. The system of claim 4 further comprising:
   means for removing from the weighted sum of the selected basic waveforms any selected basic waveforms not deemed necessary to approximate the section of audio file; and
   means for removing the corresponding stored initialization codes.

6. The system of claim 4 further comprising the means for identifying trends over sections of compressed audio file and the means for replacing the stored weighting factors for the sections of compressed audio file by a suitable function.

7. A system for compressing an audio file comprising:
   a chaotic system;
   a comparison controller to apply selected digital initialization codes to the chaotic system to produce periodic orbits and stabilize the otherwise unstable orbits and to produce a basic waveform for each periodic orbit that is in a one-to-one correspondence with the initialization code for the periodic orbit;
   a waveform comparator to analyze a section of audio file to be compressed to select basic waveforms to be used; and to store their corresponding initialization codes;
   a waveform weighter to calculate, and store, weighting factors to create a weighted sum of the selected basic waveforms to approximate the section of audio file; and
   a storage device to store the stored initialization codes and the stored weighting factors.

8. A method comprising:
   choosing a compressed audio file;
   stripping stored initialization codes out of the compressed audio file;
   applying the stored initialization codes to a chaotic system identical to the chaotic system used in producing the compressed audio file to produce the corresponding basic waveforms such that each initialization code produces a periodic orbit and stabilizes the otherwise unstable orbit;
   stripping stored weighting factors out of the compressed audio file; and
   combining corresponding basic waveforms according to the stored weighting factors to reproduce the original section of audio file.

9. A system comprising:
   means for choosing a compressed audio file;
   means for stripping stored initialization codes out of the compressed audio file;
   means for applying the stored initialization codes to a chaotic system identical to the chaotic system used in producing the compressed audio file to produce the corresponding basic waveforms such that each initialization code produces a periodic orbit and stabilizes the otherwise unstable orbit;
   means for stripping stored weighting factors out of the compressed audio file; and means for combining corresponding basic waveforms according to the stored weighting factors to reproduce the original section of audio file.

10. A method of compressing an audio signal, using a chaotic system, comprising:
causing the chaotic system to assume a periodic orbit;
generating a periodic waveform for the periodic orbit;
weighting the periodic waveform to approximate at least a portion of the audio signal; and
merging at least one initialization code and a representation of the weighting, to compress the portion of the audio signal.

11. The method of claim 10, including stabilizing the periodic orbit.

12. A method of compressing an audio signal, using a chaotic system, comprising:
causing the chaotic system to assume a plurality of periodic orbits;
generating a periodic waveform for each of a subset of the periodic orbits;
weighting a subset of the generated periodic waveforms to approximate at least a portion of the audio signal; and
merging at least one initialization code and information representative of the weighting, to compress the portion of the audio signal.

13. The method of claim 12, including assigning a zero weight to at least one of the subset of generated periodic waveforms.

14. A method of compressing an audio signal, using a chaotic system, comprising:
causing the chaotic system to assume a plurality of periodic orbits;
generating a periodic waveform for each of the periodic orbits;
weighting the periodic waveforms to approximate the audio signal; and
merging at least one initialization code and information representative of the weighting, to compress the audio signal.

15. A method of compressing an audio signal, using a chaotic system, comprising:
causing the chaotic system to assume at least one periodic orbit by applying at least one initialization code to the chaotic system;
generating a periodic waveform for each of a subset of the at least one periodic orbit;
weighting a subset of the generated periodic waveforms to approximate at least a portion of the audio signal; and
merging the at least one initialization code and information representative of the weighting, to compress the audio signal.

16. A method of compressing an audio signal, using a chaotic system, comprising:
causing the chaotic system to assume a periodic orbit;
generating a periodic waveform for the periodic orbit;
weighting the periodic waveform to approximate a first portion of the audio signal;
identifying a correlation between data in the first portion of the audio signal and data in at least one other portion of the audio signal;
merging at least one initialization code, a representation of the weighting, and a representation of the correlation, to represent the first portion of the audio signal and the at least one other portion of the audio signal, to compress the audio signal.

17. A method of decompressing a compressed representation of a first audio signal, the compressed representation produced using a first chaotic system, comprising:
causing a second chaotic system, identical to the first chaotic system, to assume a predetermined periodic orbit;
generating a periodic waveform for the periodic orbit; and
applying a predetermined weighting to the periodic waveform to produce at least a portion of a second audio signal identical to at least a portion of the first audio signal.

18. The method of claim 17, including stabilizing the periodic orbit.

19. A method of decompressing a compressed representation of a first audio signal, the compressed representation produced using a first chaotic system, comprising:
causing a second chaotic system, identical to the first chaotic system, to assume at least one predetermined periodic orbit;
generating a predetermined periodic waveform for each of a subset of the at least one predetermined periodic orbit; and
applying a predetermined weighting to at least one generated predetermined periodic waveform to produce at least a portion of a second audio signal perceived by a listener to be identical to at least a portion of the first audio signal.

20. A method of decompressing a compressed representation of a first audio signal, the compressed representation produced using a first chaotic system, comprising:
causing a second chaotic system, identical to the first chaotic system, to assume a plurality of predetermined periodic orbits;
generating a predetermined periodic waveform for each of a subset of the predetermined periodic orbits; and
applying a predetermined weighting to at least one generated periodic waveform to produce at least a portion of a second audio signal perceived by a listener to be identical to at least a portion of the first audio signal.

21. A method of decompressing a compressed representation of a first audio signal, the compressed representation produced using a first chaotic system, comprising:
causing a second chaotic system, identical to the first chaotic system, to assume a predetermined periodic orbit;
generating a periodic waveform for the periodic orbit;
applying a predetermined weighting to the periodic waveform to produce a first portion of a second audio signal substantially identical to a first portion of the first audio signal; and
applying, to the first portion of the second audio signal, a predetermined correlation between data in the first portion of the first audio signal and data in at least one other portion of the first audio signal, to produce at least one other portion of the second audio signal perceived by a listener to be identical to the at least one other portion of the first audio signal.

* * * * *